June 3, 1958　　　F. J. LYDEN　　　2,837,174
COMBINED DROP AND FLUSH OILERS
Filed Oct. 13, 1955　　　3 Sheets-Sheet 2
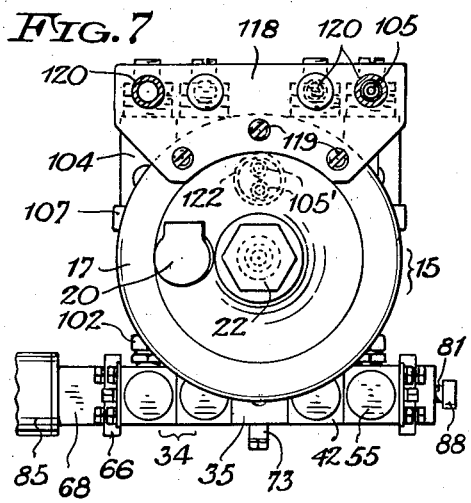
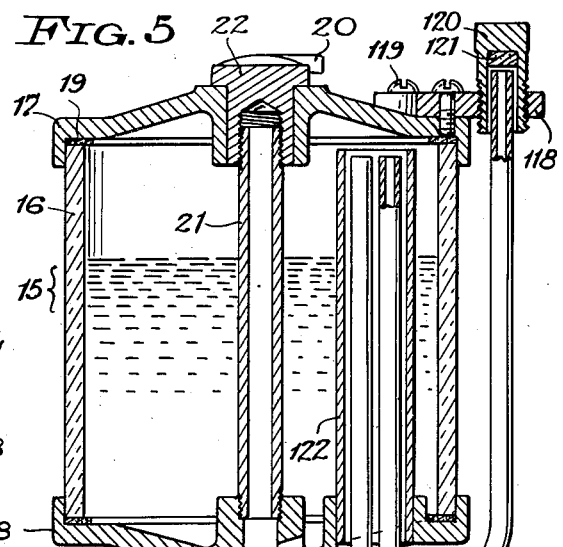
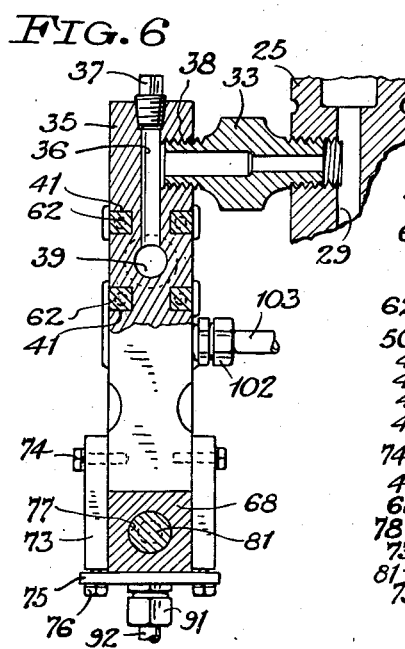
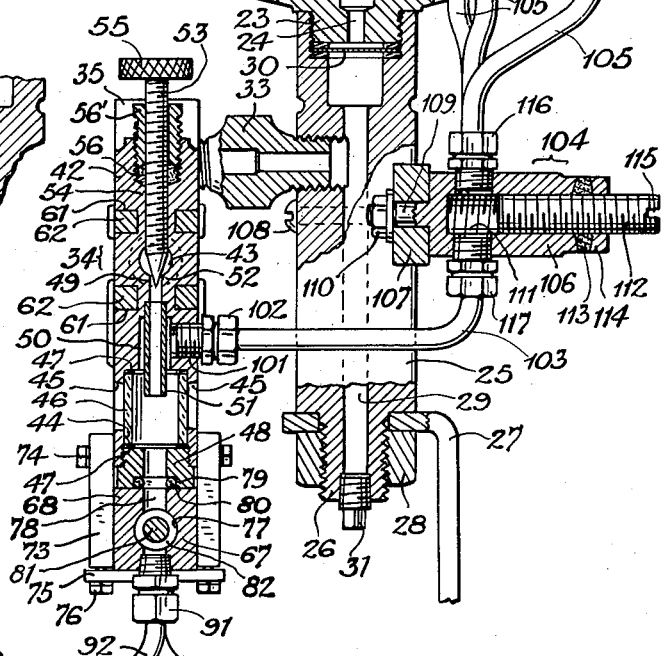
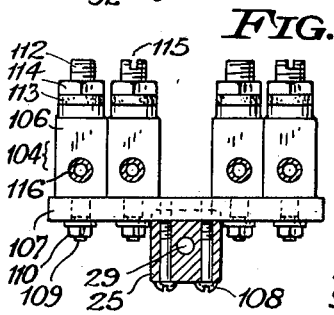
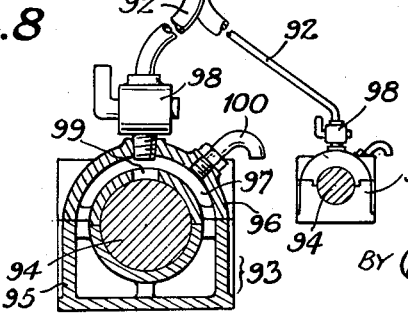
INVENTOR
FRANK J. LYDEN
BY Christopher L. Waal
ATTORNEY

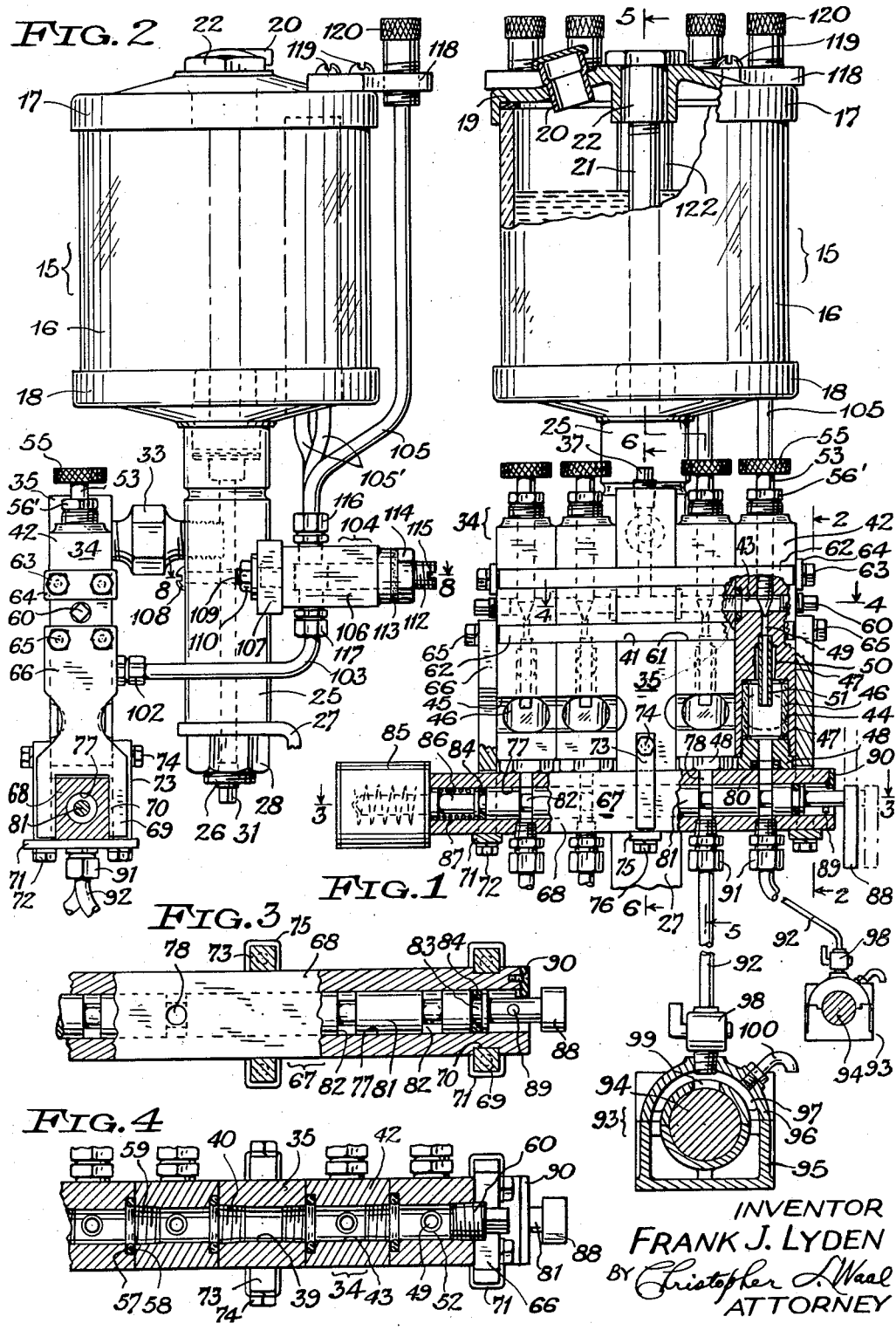

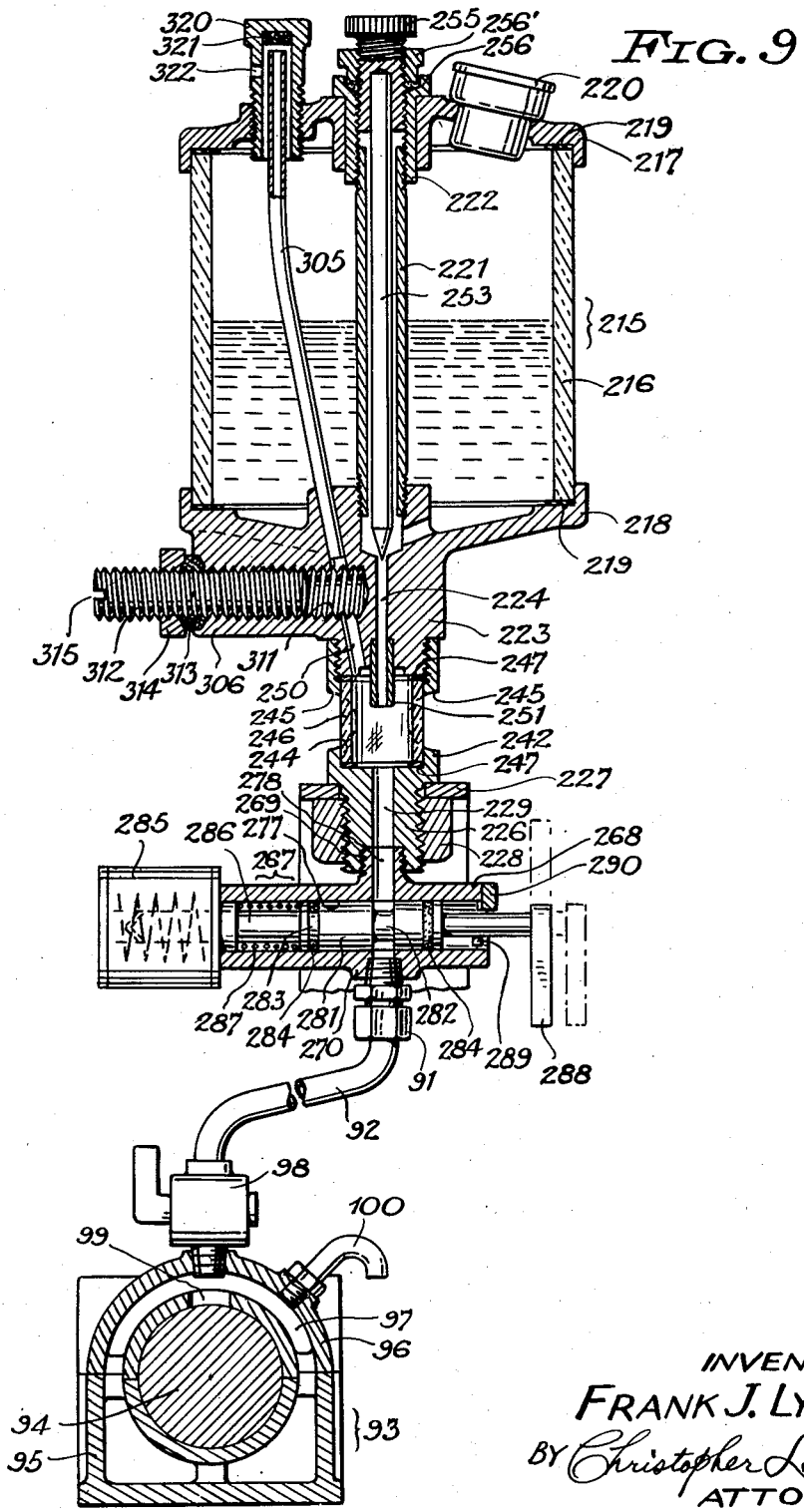

United States Patent Office 2,837,174
Patented June 3, 1958

2,837,174
COMBINED DROP AND FLUSH OILERS
Frank J. Lyden, Manitowoc, Wis.
Application October 13, 1955, Serial No. 540,221
14 Claims. (Cl. 184—81)

The present invention relates to lubricating apparatus and more particularly to drop feed oilers.

In certain types of machines, it is customary to feed oil to bearings and other lubricated parts in small regulated quantities, as by drop feed oiling means. However, upon starting a lubricated machine, it is sometimes desirable to supply a substantially increased amount of oil to the bearings for a short time in order to insure proper lubrication.

An object of the invention is to provide an improved oiler of simple, reliable and inexpensive construction which in normal operation will feed oil drop by drop to a machine bearing and which will automatically flood or flush the bearing with oil when the machine is started in operation.

Another object is to provide a combined drop and flush oiler which will permit ready adjustment of the quantity of flushing oil supplied to the bearing.

A further object is to provide a combined drop and flush oiler having simple but effective means for preventing a flushing operation when this operation is not required.

A still further object is to provide a combined drop and flush oiler with multiple outlets to serve a plurality of lubrication points, and in which the delivery of flushing or flooding oil to the outlets can be individually regulated.

The invention further consists in the several features hereinafter described and claimed.

In the accompanying drawings, illustrating certain embodiments of the invention, Fig. 1 is a front elevational view of a combined multiple feed drop and flush oiler constructed in accordance with the invention, parts being broken away and parts being shown in section;

Fig. 2 is a transverse sectional view taken generally on the line 2—2 of Fig. 1;

Fig. 3 is a detail sectional view taken generally on the line 3—3 of Fig. 1;

Fig. 4 is a detail sectional view taken generally on the line 4—4 of Fig. 1;

Fig. 5 is a transverse sectional elevational view taken generally on the line 5—5 of Fig. 1;

Fig. 6 is a transverse sectional elevational view taken generally on the line 6—6 of Fig. 1;

Fig. 7 is a top view of the oiler, parts being broken away and parts being shown in section;

Fig. 8 is a detail sectional view taken generally on the line 8—8 of Fig. 2, and Fig. 9 is a transverse sectional elevational view of a modified form of oiler.

Referring to the form of the invention shown in Figs. 1 to 8, 15 designates an oil reservoir here shown to comprise a transparent tubular casing member or shell 16 closed by upper and lower heads 17 and 18, the ends of the shell bearing against gasket rings 19, and the upper head having a capped filling nozzle 20. The heads are connected as usual by a central vertical tube 21 which is screwed at its lower end into the lower head and is screwed at its upper end into a headed bushing or nut 22 rotatably fitting in the upper head. The lower head has a central, downwardly projecting, screw-threaded boss 23 with an axial outlet bore 24. The boss 23 is screwed into the recessed upper end of a supporting pillar or shank 25. The pillar has a reduced screw-threaded lower end portion 26 extending through a supporting bracket 27 and clamped to the bracket by a nut 28. A bore 29 extends axially through the pillar and has an enlarged upper end with a filter screen 30 through which oil passes from the outlet bore 24 of the lower reservoir head 18. The lower end of the pillar bore 29 is closed by a screw plug 31. A lateral opening 32 is formed in the pillar in communication with the bore 29 and has screwed therein a tubular coupling member 33.

The reservoir supplies oil under a gravity head to a plurality of vertically extending sight feed valves 34 each of which is similar in some respects to the form of valve shown in my United States Patent 2,646,856 for Multiple Oilers, issued July 28, 1953. By way of example, four sight feed valves are shown and are supported side by side in a row by an intermediate mounting body 35, as hereinafter described. The mounting body is in the form of a vertically extending metal block of square cross-section having a central vertical bore 36 closed at its upper end by a pipe plug 37. A lateral, screw-threaded inlet bore 38 communicates with the upper portion of the vertical bore 36. The tubular coupling member 33 is screwed into the lateral inlet bore 38, thus supporting the mounting body from the pillar 25 and supplying oil to the vertical bore 36. Below the inlet bore 38 the valve mounting body 35 has a transverse horizontal bore 39 which intersects the vertical bore 36 and forms part of a horizontal manifold passage extending through the several sight feed valves. In some instances the opposite ends of the horizontal bore 39 may be provided with screw threads 40. In opposite sides of the mounting body are horizontal channels 41 of square cross-section extending parallel to the manifold bore 39 and arranged above and below the horizontal plane of the manifold bore.

Each sight feed valve includes an elongated vertical block-like valve body 42 of square cross-section formed of a suitable metal, such as an aluminum alloy. The valve body has a transverse horizontal bore 43 therethrough adapted to register with similar bores formed in adjacent valve bodies and with the mounting body bore 39 to form the manifold passage. The lower end portion of each valve body has a large vertical bore 44 which is intersected at opposite sides by horizontal channels 45 of semi-circular cross-section. Axially extending in the vertical bore 44 is a vertical sight tube 46 of glass or transparent plastic forming therein a sight chamber. The sight tube is seated at its upper and lower ends against gaskets 47 and is confined by a centrally apertured discharge bushing 48 screwed into the lower end of the bore. The discharge bushings are connected to bearings to be lubricated, as hereinafter described. A vertical bore or orifice 49 is formed centrally in each valve body between the transverse manifold bore 43 and the upper end of the vertical bottom bore 44. The bore 49 includes a counterbore 50 which opens into the upper end of the sight chamber and communicates with venting and flushing means hereinafter described. A drip nozzle 51 is secured at its upper end in the bore 49 and has its lower end extending into the sight chamber. The upper end of the vertical bore 49 communicates with the horizontal bore 43 and has a tapered valve seat 52. A vertical needle valve 53 is screwed in a central vertical bore 54 extending in the valve body above the transverse bore 43. The needle valve has a tapered lower end adapted to cooperate with the valve seat 52, and has a knurled thumb wheel 55 at its projecting upper end. A packing 56 in the valve body surrounds the intermediate portion of the needle valve and is retained by a packing nut 56' which is screw-threaded into the upper end of the valve body and which receives therethrough the needle valve. The needle valve serves to control the rate of drop flow of oil from the manifold bore 43 into the drip nozzle 51 and is frictionally retained in adjusted position by the packing 56. The needle valve can be raised to permit free communication between the bores 43 and 49, and can be raised farther to a point above the bore 43.

The transverse through bore 43 in each valve body has a counterbore 57 at one end to receive a sealing O-ring 58, and the other end of the bore has a screw thread 59 adapted to receive a pipe plug 60 when the valve body is endmost in the assembly. The opposite flat side faces of each valve body are provided with horizontal upper and lower channels 61 of square cross-section aligned with the mounting body channels 41 and adapted to receive retaining means hereinafter described.

The multiple oiler shown in the drawing includes a pair of sight feed valves at each of the opposite sides of the mounting body, but it will be understood that any reasonable number of valves may be provided. The several block-like bodies are held in laterally abutting assembled relation by retaining means including four tie rods or bars 62 of square cross-section fitting in the aligned lateral grooves or channels 41 and 61 formed in these oilers, the rods being slightly shorter than the length of the body assembly or stack, and the outer side faces of the rods being flush with the flat side faces of the bodies. The opposite ends of the upper rods are connected by screws 63 to transverse clamping plates 64 laterally engaging the endmost valve bodies. The lower rods 62 are similarly secured by screws 65 to vertical clamping plates 66 laterally engaging the endmost valve bodies.

A multiple control valve or shut-off valve 67 extends horizontally under the discharge bushings 48 for the sight feed valves and includes an elongated valve body 68 of square cross-section suitably secured in abutment with the flat bottom faces of these bushings. The vertical clamping plates 66 have forked lower ends 69, Figs. 2 and 3, which fit in vertical grooves 70 formed in the opposite sides of the valve body 68, and are connected at their lower ends by horizontal clamping plates 71 engaging the bottom face of the valve body 68, the plates being secured to the end forks 69 by screws 72. The control valve body 68 may be further clamped by vertical side bars 73 secured to the mounting body 35 by screws 74, and by a cross plate 75 secured by screws 76 to the lower ends of the vertical bars 73. The control valve body 68 has formed therethrough a central longitudinal bore 77 which is intersected by spaced vertical port-forming bores 78 aligned with the apertured discharge bushings 48. The lower ends of the centrally apertured bushings are provided with respective counterbores 79 receiving sealing O-rings 80 which bear on the upper face of the control valve body. A reciprocable cylindrical valve rod 81 slidably and rotatably fits in the bore 77 and is provided with axially spaced annular grooves 82 adapted to register with the respective vertical bores 78 when the control valve is in open position, as seen in Fig. 1. When the valve rod is shifted to closed position, the cylindrical periphery of the rod closes the vertical passages or bores 78 of the control valve body. The valve rod is further provided with annular grooves 83 receiving sealing O-rings 84.

The control valve or shut-off valve is preferably capable of both manual and automatic operation, and is here shown to include a solenoid 85 mounted at one end of the control valve body 68, the valve rod having a magnetic end section or core 86 cooperating with the solenoid. A coiled spring 87 surrounding the valve rod urges the valve rod to closed position, and the valve rod is moved by the solenoid to open position against the action of the spring. The other end of the valve rod carries a handle 88 for manually moving the valve rod to open position, and a radial pin 89 on the valve rod is adapted to engage a detent plate 90 secured to the valve body for retaining the valve rod in open position against the action of the return spring. The valve rod may be turned by its handle to permit retention and release of the valve rod.

The lower ends of the vertical bores 78 in the control valve body are provided with couplings 91 connected to delivery tubes 92 leading to respective machine parts to be lubricated, such as journal bearings 93 for one or more shafts 94 of a machine. Each bearing is here shown to include a housing 95 with a bearing cap 96 and a chamber 97. The associated oil delivery tube 92 is attached to the bearing cap above the shaft and if desired may be provided with a normally open shut-off valve 98. The oil drips through the upper part of the chamber 97 and onto the shaft through an opening 99 in the inner part of the hollow bearing cap. The chamber 97 is preferably provided with a vent tube 100 to avoid building up of internal pressure which might interfere with oil feed. The control valve solenoid 85 is energized to valve-opening position when the machine is started and remains energized as long as the machine is in operation. This is readily accomplished, as by connecting the solenoid across the terminals of a motor, not shown, for the machine.

The vertical counterbore 50 in each sight feed valve body communicates with the upper end of the associated sight feed chamber and also communicates with a lateral opening 101 formed in this body. A coupling 102 is screwed into the lateral opening 101 and is connected to a combined venting and gravity-flow flushing conduit, Fig. 5, including a lower tube 103, a metering device 104, and an upper tube 105. By way of example, upper tubes 105 are provided for two of the sight feed valves, while slightly modified upper tubes 105' are provided for the other two valves. The metering device 104 comprises a plurality of horizontal barrels 106, one for each sight feed valve, disposed above the level of the sight chambers and carried on a cross plate 107 which is secured to the pillar 25, as by screws 108. Each barrel has a coaxial stud 109 secured in the cross plate, as by a nut 110, and has a coaxial bore 111 in which a stem or plunger 112 is adjustably threaded to vary the effective capacity or volume of the barrel. The outer end portion of the adjusting stem 112 is sealed by a packing 113 and nut 114, and is provided with a screw-driver slot 115. Each barrel has aligned upper and lower couplings 116 and 117 communicating with the bore 111, the lower coupling being connected to the lower tube 103, and the upper coupling being connected to the upper tube 105 (or 105'). A horizontal bracket plate 118 is secured, as by screws 119, to the upper head 17 of the oil reservoir. Vertical tubular valve caps 120 are screwed into the bracket plate and are provided with inner packing disks 121. The open upper ends of the upper vent tubes 105 extend loosely into the associated valve caps in protective position therein and can be closed by screwing down the caps, so as to prevent accumulation of flushing oil in the venting conduits without disturbing the needle valves 53. The modified upper tubes 105' extend upwardly in protected position in a vertical pipe 122 which projects upwardly in the oil reservoir and is secured at its lower end in the lower head 18 of the reservoir, as seen in Fig. 5.

In the normal operation of the oiling apparatus of Figs. 1 to 8, the control or shut-off valve 67 is open, as seen in Fig. 1, and the machine served by the apparatus is running. Oil feeds drop by drop at a suitably adjusted rate into the sight tubes 46 and flows by gravity through the open passages of the shut-off valve and the delivery tubes 93 to the bearings of the machine.

When the machine stops, the valve solenoid 85 is deenergized and the coiled spring 87 closes the multiple shut-off valve 67, whereupon feeding of oil to the delivery tubes ceases. However, oil continues to flow drop by drop from the drip nozzles 51 and eventually fills the sight chambers and rises in the venting conduits 103, 104, 105 to the level of the oil in the reservoir, whereupon flow of oil ceases.

When the machine is again started, the solenoid 85 is again energized, opening the shut-off valve 67, whereupon the oil which has accumulated in the venting conduits will flow rapidly through the delivery tubes to the bearings, thus flushing or flooding the bearings with oil to insure good lubrication. After the flushing or flooding operation the drop feeding of oil is automatically resumed.

The amount of flushing oil supplied to each delivery tube can readily be adjusted by the associated screw plunger 112 of the metering device 104, thus providing for adequate flushing while avoiding waste of oil. If flushing of a selected bearing is not required, accumulation of flushing oil can be prevented by closing the upper end of the associated venting tube 105, this being effected by screwing down the superposed valve cap 120. Closing of the vent tube 105 will not interfere with the drop feed when the shut-off valve 67 is open, since venting is then effected through the corresponding delivery tube 92 and the vent tube 100 on the bearing.

The modified form of lubricating apparatus or oiler shown in Fig. 9 is suitable for feeding oil to a single delivery tube 92 which is connected to one or more of the bearings 93. The oiler includes a reservoir 215 with a transparent cylindrical shell 216 closed by upper and lower heads 217 and 218, the ends of the shell bearing against gasket rings 219, and the upper head having a capped oil filling nozzle 220. The spaced heads 217 and 218 are connected by a central vertical tube 221, the lower end of the tube being screwed into the lower head, and the upper end of the tube being screwed into a headed bushing or nut 222 rotatably fitting in the upper head. The lower head has a downwardly projecting boss 223 through which extends a central vertical discharge bore 224. The upper end of the bore 224 forms a seat for a needle valve 253 which extends axially in the connector tube 221. The upper end of the needle valve is attached to an adjusting knob 255 which is screwed in the bushing 222 at the upper head and is retained in adjusted position by a packing 256 and a packing nut 256'.

A vertically extending sight feed fitting 242 is screwed onto the reduced lower end of the reservoir boss 223 and houses therein a transparent sight feed tube 246 sealed by upper and lower gaskets 247, the sides of the fitting having apertures 248 to expose the sight feed tube. A drip nozzle 251 extends downwardly from the bore 224 into the sight chamber formed in the transparent tube 246. The fitting 242 has a reduced lower screw-threaded shank 226 with a central vertical discharge bore 229. The shank 226 extends through a supporting bracket 227 and is secured thereto by a nut 228.

A control or shut-off valve 267 is disposed below the sight feed fitting 242 and includes a horizontally extending tubular valve body 268 having a tubular upper boss 269 which is screwed into the lower end of the fitting. The valve body has a longitudinal bore 277 which is intersected by a vertical port-forming bore 278 extending through the attaching boss 269 and through a lower boss 270. The delivery tube 92 is connected to the lower boss 270 by a coupling 91. A valve rod or piston 281 slidably and rotatably fits in the bore 277 and has a peripheral channel or groove 282 adapted to register with the vertical bore 278 in the open position of the valve. The valve rod is further provided with annular grooves 283 receiving sealing O-rings 284.

A solenoid 285 is mounted on an end of the control valve body 268, and the valve rod 281 has a magnetic end section or core 286 cooperating with the solenoid. A coiled spring 287 surrounding the valve rod urges the valve rod to closed position, and the valve rod is moved by the solenoid to open position against the action of the spring. The other end of the rod carries a handle 288 for manually moving the valve rod to open position, and a radial pin 289 on the valve rod is adapted to engage a detent plate 290 secured to the valve body, so as to retain the valve rod in open position against the action of the return spring. The valve rod 281 may be turned by its handle to permit retention and release of the valve rod.

A vent passage 250 extends upwardly in the lower reservoir head 218 from the upper end of the sight chamber and is connected at its upper end by a vent tube 305 the upper end of which extends upwardly through the upper head 217 of the reservoir. The vent passage 250 is intersected by a horizontal bore 311 extending in a radial rib 306 formed on the lower head 218. A metering plunger or stem 312 is screw-threaded on the bore 311 to adjust the effective capacity or volume of the bore 311. The stem 312 is sealed by a packing 313 and nut 314 and has a screw-driver slot 315 in its outer end.

A tubular valve cap 320 is screwed into the upper head 217 and loosely surrounds the open upper end of the vent tube 305 in protective position. A packing disk 321 is secured in the cap and is adapted to close the open upper end of the vent tube when oil flushing is not required. The cap is here shown to have a lateral port 322, but this port may be omitted if the reservoir is otherwise vented, as through the filling nozzle.

The operation of the oiling apparatus of Fig. 9 is the same as that of Fig. 1. An automatic flushing action may also be obtained by leaving the shut-off valve 267 open and manipulating the shut-off valve 98 at the bearing. However, it is preferred to rely on the shut-off valve 267 at the oiler since this valve can then form a part of the oiler assembly and can be conveniently controlled. Also, the flushing capacity can be more accurately adjusted since it is not necessary to take into account the volume of the delivery tube.

I claim:

1. A combined drop and flush oiling apparatus, comprising a body having a chamber, means for feeding oil dropwise into said chamber, a discharge conduit extending downwardly from said chamber for supplying oil to a device to be lubricated, a shut-off valve for said conduit disposed lower than said chamber, and a venting conduit extending upwardly from said chamber for accumulating a head of flushing oil therein from said feeding means when said shut-off valve is closed, and for discharging the accumulated flushing oil through said discharge conduit when the shut-off valve is opened.

2. A combined drop and flush oiling apparatus, comprising a body having a chamber, means for feeding oil dropwise into said chamber, a discharge conduit extending downwardly from said chamber for supplying oil to a device to be lubricated, a shut-off valve for said conduit, a venting conduit extending upwardly from said chamber for accumulating a head of flushing oil therein from said feeding means when said shut-off valve is closed, and for discharging the accumulated flushing oil through said discharge conduit when the shut-off valve is opened, and means for adjusting the effective capacity of said venting conduit.

3. A combined drop and flush oiling apparatus, comprising a body having a chamber, means for feeding oil dropwise into said chamber, a discharge conduit extending downwardly from said chamber for supplying oil to a device to be lubricated, a shut-off valve for said conduit, a venting conduit extending upwardly from said chamber for accumulating a head of flushing oil therein from said feeding means when said shut-off valve is closed, and for discharging the accumulated flushing oil through said discharge conduit when the shut-off valve is opened, and valve means for closing said venting conduit to prevent accumulation of flushing oil in said conduit.

4. A combined drop and flush oiling apparatus, comprising a body having a chamber, means for feeding oil dropwise into said chamber, a discharge conduit extending downwardly from said chamber for supplying oil to a device to be lubricated, a shut-off valve for said conduit, a venting conduit extending upwardly from said chamber for accumulating a head of flushing oil therein from said feeding means when said shut-off valve is closed, and for discharging the accumulated flushing oil through said discharge conduit when the shut-off valve is opened, said venting conduit having an open upper end, and valve means for closing said open upper end of the venting conduit to prevent accumulation of flushing oil in said conduit.

5. A combined drop and flush oiling apparatus, comprising means providing a plurality of chambers, means for feeding oil dropwise into said chambers, discharge conduits extending downwardly from said respective chambers for supplying oil to devices to be lubricated, shut-off valve means for simultaneously controlling said discharge conduits, venting conduits extending upwardly from said respective chambers and each adapted to accumulate a head of flushing oil therein from the associated feeding means when said shut-off valve means is closed, and to discharge the accumulated flushing oil through the associated discharge conduit when the shut-off valve means is open, and means for independently adjusting the effective capacity of said venting conduits.

6. A combined drop and flush oiling apparatus, comprising means providing a plurality of chambers, means for feeding oil dropwise into said chambers, discharge conduits extending downwardly from said respective chambers for supplying oil to devices to be lubricated, shut-off valve means for simultaneously controlling said discharge conduits, venting conduits extending upwardly from said respective chambers and each adapted to accumulate a head of flushing oil therein from the associated feeding means when said shut-off valve means is closed, and to discharge the accumulated flushing oil through the associated discharge conduit when the shut-off valve means is open, and valve means for independently closing said venting conduits to prevent accumulation of flushing oil in a selected venting conduit.

7. A combined drop and flush oiling apparatus, comprising an oil reservoir, a body having a chamber, means for gravity-feeding oil dropwise from said reservoir into said chamber, a discharge conduit extending downwardly from said chamber for supplying oil to a device to be lubricated, a shut-off valve for said discharge conduit and disposed lower than said chamber, a venting conduit extending upwardly from the upper portion of said chamber to an elevation above the oil level in said reservoir and adapted to accumulate a head of flushing oil therein from said feeding means when said shut-off valve is closed, and to discharge the accumulated flushing oil through said discharge conduit when the shut-off valve is opened.

8. A combined drop and flush oiling apparatus, comprising a plurality of sight feed valves having respective chambers into which oil is fed dropwise, said chambers having respective bottom outlets, a multiple shut-off valve having a valve body disposed below said sight feed valves and having valved passages communicating with said chamber outlets and adapted for connection to discharge conduits for gravitationally supplying oil to devices to be lubricated, venting conduits extending upwardly from the upper portions of said respective chambers and each adapted to accumulate a head of flushing oil therein from an associated feeding means when said shut-off valve is closed, and to discharge the accumulated flushing oil through the associated discharge conduit when the shut-off valve is opened.

9. A combined drop and flush oiling apparatus, comprising a body having a chamber, means for feeding oil dropwise into said chamber, a discharge conduit extending downwardly from said chamber for supplying oil to a device to be lubricated, an electromagnetically operated shut-off valve for said conduit disposed lower than said chamber, and a venting conduit extending upwardly from the upper portion of said chamber for accumulating a head of flushing oil therein from said feeding means when said shut-off valve is closed, and for discharging the accumulated flushing oil through said discharge conduit when the shut-off valve is opened.

10. A combined drop and flush oiling apparatus, comprising a body having a chamber, means for feeding oil dropwise into said chamber, a discharge conduit extending downwardly from said chamber for supplying oil to a device to be lubricated, a shut-off valve for said conduit, a venting conduit extending upwardly from said chamber for accumulating a head of flushing oil therein from said feeding means when said shut-off valve is closed, and for discharging the accumulated flushing oil through said discharge conduit when the shut-off valve is opened, means providing a metering chamber extending laterally from said venting conduit, and a displaceable member movable in said metering chamber for adjusting the effective capacity of said venting conduit.

11. A combined drop and flush oiling apparatus, comprising a body having a chamber, means for feeding oil dropwise into said chamber, a discharge conduit extending downwardly from said chamber for supplying oil to a device to be lubricated, a shut-off valve for said conduit, a venting conduit extending upwardly from said chamber for accumulating a head of flushing oil therein from said feeding means when said shut-off valve is closed, and for discharging the accumulated flushing oil through said discharge conduit when the shut-off valve is opened, means providing a bore extending laterally from said venting conduit, and a screw member movable in said bore for adjusting the effective capacity of said venting conduit.

12. A combined drop and flush oiler, comprising an oil reservoir having a lower head with an oil outlet, a flow sight disposed below said head and including a chamber in which oil is gravity-fed dropwise from said reservoir, a discharge conduit extending downwardly from said chamber for supplying oil to a device to be lubricated, a shut-off for said conduit, a venting conduit extending upwardly from said chamber through said lower head for accumlating a head of flushing oil from said chamber when the shut-off valve is closed, and for discharging the accumulated flushing oil through said discharge conduit when the shut-off valve is opened, and means carried by said reservoir head for adjusting the effective capacity of said venting conduit.

13. A combined drop and flush oiler, comprising an oil reservoir, a flow sight extending below said reservoir and having a chamber in which oil is gravity-fed dropwise from said reservoir, said flow sight having a bottom outlet extending downwardly from said chamber, a shut-off valve secured to said flow sight below said chamber and having a valved passage communicating with said chamber outlet and adapted for connection to a discharge conduit extending downwardly to a device to be lubricated, a venting conduit extending upwardly from said chamber within said reservoir to an elevation higher than the oil level in the reservoir for accumulating a head of flushing oil from said chamber when the shut-off valve is closed, and to discharge the accumulated flushing oil through the shut-off valve passage when the valve is opened.

14. A combined drop and flush oiler, comprising an oil reservoir having upper and lower heads, means providing a chamber into which oil is gravity-fed dropwise from said reservoir, a discharge conduit extending downwardly from said chamber for supplying oil to a device to be lubricated, a shut-off valve for said conduit disposed lower than said chamber, a venting conduit extending upwardly from said chamber for accumulating a head of flushing oil therein from said chamber when said shut-off valve is closed, and for discharging the accumulated flushing oil through said discharge conduit when the shut-off valve is opened, said venting conduit extending upwardly in said reservoir to a point above the oil level in said reservoir, and valve means carried by said upper reservoir head for closing said venting conduit when accumulation of flushing oil is not required.

References Cited in the file of this patent

UNITED STATES PATENTS

| | | |
|---|---|---|
| 1,763,961 | Gits | June 17, 1930 |
| 1,956,640 | Danver | May 1, 1934 |
| 2,096,808 | Jenkins | Oct. 26, 1937 |
| 2,646,856 | Lyden | July 28, 1953 |

FOREIGN PATENTS

| | | |
|---|---|---|
| 420,947 | Great Britain | Dec. 11, 1934 |